United States Patent
Chung et al.

(10) Patent No.: US 9,281,546 B2
(45) Date of Patent: Mar. 8, 2016

(54) BATTERY PACK CASE HAVING NOVEL STRUCTURE

(75) Inventors: Chae Ho Chung, Daejeon (KR); Ye Hoon Im, Daejeon (KR); Jin Kyu Lee, Busan (KR); BumHyun Lee, Seoul (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/635,745

(22) PCT Filed: Apr. 7, 2011

(86) PCT No.: PCT/KR2011/002436
§ 371 (c)(1),
(2), (4) Date: Dec. 6, 2012

(87) PCT Pub. No.: WO2011/129545
PCT Pub. Date: Oct. 20, 2011

(65) Prior Publication Data
US 2013/0071719 A1    Mar. 21, 2013

(30) Foreign Application Priority Data
Apr. 13, 2010  (KR) ......................... 10-2010-0033607

(51) Int. Cl.
*H01M 10/50* (2006.01)
*H01M 2/10* (2006.01)
(Continued)

(52) U.S. Cl.
CPC ........ *H01M 10/5004* (2013.01); *H01M 2/1061* (2013.01); *H01M 10/613* (2015.04); *H01M 10/625* (2015.04); *H01M 10/6556* (2015.04); *H01M 10/6566* (2015.04)

(58) Field of Classification Search
None
See application file for complete search history.

(56) References Cited

U.S. PATENT DOCUMENTS 8,211,564 B2 *  7/2012  Choi et al. ................... 429/120
8,298,698 B2 * 10/2012  Chung et al. ................ 429/120
(Continued)

FOREIGN PATENT DOCUMENTS

EP       1 753 068 A1     2/2007
KR    10-2006-0037600 A   5/2006
(Continued)

OTHER PUBLICATIONS

U.S. Appl. No. 13/203,246, filed Dec. 2011, Chung et al.*
(Continued)

*Primary Examiner* — Patrick Ryan
*Assistant Examiner* — Christopher Domone
(74) *Attorney, Agent, or Firm* — Birch, Stewart, Kolasch & Birch, LLP

(57) ABSTRACT

Disclosed herein is a battery pack case in which a battery module having a plurality of stacked battery cells or unit modules ('unit cells') is mounted, wherein the battery pack case is provided at the upper part and the lower part thereof with a coolant inlet port and a coolant outlet port, respectively, which are directed in opposite directions such that a coolant to cool the unit cells can flow from one side to the other side of the battery module in a direction perpendicular to a cell stacking direction, the battery pack case is further provided with a flow space ('coolant introduction part') extending from the coolant inlet port to the battery module and another flow space ('coolant discharge part') extending from the battery module to the coolant outlet port, and the flow channel width of the coolant introduction part and/or the flow channel width of the coolant discharge part is greater than that of each of the unit cells, thereby achieving uniform distribution of the coolant.

28 Claims, 16 Drawing Sheets

(51) Int. Cl.
*H01M 10/613* (2014.01)
*H01M 10/625* (2014.01)
*H01M 10/6556* (2014.01)
*H01M 10/6566* (2014.01)

(56) References Cited

U.S. PATENT DOCUMENTS

| | | | |
|---|---|---|---|
| 8,492,016 B2* | 7/2013 | Shin et al. | 429/71 |
| 9,139,104 B2 | 9/2015 | Chang et al. | |
| 2006/0093901 A1* | 5/2006 | Lee et al. | 429/120 |
| 2006/0115716 A1 | 6/2006 | Kim et al. | |
| 2008/0124627 A1* | 5/2008 | Shimoyama | 429/186 |
| 2009/0220853 A1 | 9/2009 | Yang et al. | |
| 2009/0305116 A1 | 12/2009 | Yang et al. | |
| 2009/0311586 A1 | 12/2009 | Chung et al. | |
| 2010/0035142 A1 | 2/2010 | Ha et al. | |
| 2011/0008657 A1 | 1/2011 | Chung et al. | |
| 2011/0177367 A1 | 7/2011 | Chung et al. | |

FOREIGN PATENT DOCUMENTS

| | | | |
|---|---|---|---|
| KR | 10-2006-0037601 A | 5/2006 |
| KR | 10-2006-0037627 A | 5/2006 |
| KR | 10-2007-0112489 A | 11/2007 |
| KR | 10-2007-0112490 A | 11/2007 |
| KR | 10-2008-0025428 A | 3/2008 |
| KR | 10-2009-0000307 A | 1/2009 |
| KR | 10-2009-0002428 A | 1/2009 |
| KR | 10-2009-0010393 A | 1/2009 |
| KR | 10-2009-0030545 A | 3/2009 |
| KR | 10-2009-0129044 A | 12/2009 |
| KR | 10-2010-0012018 A | 2/2010 |
| WO | WO 2008/153326 A2 | 12/2008 |
| WO | WO 2009/002096 A1 | 12/2008 |
| WO | WO 2009/108013 A2 | 9/2009 |
| WO | WO 2009/151287 A2 | 12/2009 |
| WO | WO 2010/013902 A2 | 2/2010 |

OTHER PUBLICATIONS

International Search Report issued in PCT/KR2011/002436, mailed on Dec. 29, 2011.

European Supplementary Search Report dated Jun. 11, 2015.

\* cited by examiner

Comparative Example

Comparative Example

Comparative Example

BATTERY PACK CASE HAVING NOVEL STRUCTURE

TECHNICAL FIELD

The present invention relates to a battery pack case having a novel structure, and, more particularly, to a battery pack case in which a battery module having a plurality of stacked battery cells or unit modules ('unit cells') is mounted, wherein the battery pack case is provided at the upper part and the lower part thereof with a coolant inlet port and a coolant outlet port, respectively, which are directed in opposite directions such that a coolant to cool the unit cells can flow from one side to the other side of the battery module in a direction perpendicular to a cell stacking direction, the battery pack case is further provided with a flow space ('coolant introduction part') extending from the coolant inlet port to the battery module and another flow space ('coolant discharge part') extending from the battery module to the coolant outlet port, and the flow channel width of the coolant introduction part and/or the flow channel width of the coolant discharge part is greater than that of each of the unit cells, thereby achieving uniform distribution of the coolant.

BACKGROUND ART

Recently, a secondary battery has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle or large-sized devices, such as vehicles, use a middle or large-sized battery module having a plurality of battery cells electrically connected to each other because high power and capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on such a pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In order for the middle or large-sized battery module to provide power and capacity required by a specific apparatus or device, it is necessary for the middle or large-sized battery module to be configured to have a structure in which a plurality of battery cells is electrically connected in series to each other, and the battery cells are stable against an external force.

Also, the battery cells constituting the middle or large-sized battery module are secondary batteries which can be charged and discharged. Consequently, a large amount of heat is generated from the high power, high capacity secondary batteries during the charge and discharge of the batteries. If the heat, generated from the unit cells during the charge and discharge of the unit cells, is not effectively removed, the heat accumulates in the respective unit cells with the result that the deterioration of the unit cells is accelerated. According to circumstances, the unit cells may catch fire or explode. For this reason, a cooling system is needed in a battery pack for vehicles, which is a high power, high capacity battery, to cool battery cells mounted in the battery pack.

In a middle or large-sized battery pack including a plurality of battery cells, on the other hand, the deterioration in performance of some battery cells leads to the deterioration in performance of the entire battery pack. One of the main factors causing the non-uniformity in performance is the non-uniformity of cooling between the battery cells. For this reason, it is necessary to provide a structure to secure the uniformity of cooling during the flow of a coolant.

Some conventional middle or large-sized battery packs use a battery pack case configured to have a structure in which a coolant inlet port and a coolant outlet port are located at the upper part and the lower part of the battery pack case such that the coolant inlet port and the coolant outlet port are directed in opposite directions, and the top and bottom of a flow space extending from the coolant inlet port to the battery module are parallel to each other. In this structure, however, a relatively high coolant flux is introduced into flow channels defined between the battery cells adjacent to the coolant outlet port, whereas a relatively low coolant flux is introduced into flow channels defined between the battery cells adjacent to the coolant inlet port with the result that it is difficult to achieve uniform cooling of the battery cells.

In connection with this matter, Korean Patent Application Publication No. 2006-0037600, No. 2006-0037601, and No. 2006-0037627 disclose a middle or large-sized battery pack configured to have a structure in which an air guide plane is inclined downward to a side of a battery pack case opposite to battery cells so that the air guide plane becomes closer to the battery cells with the increase in distance between the air guide plane and a coolant inlet port. Specifically, the air guide plane is inclined at a predetermined angle, for example an angle of 15 to 45 degrees, to the side of the battery pack case opposite to the battery cells, thereby restraining the occurrence of a phenomenon in which a coolant is excessively introduced into flow channels defined between the battery cells adjacent to the coolant outlet port.

However, the inventors of the present application have found that the temperature deviation between the battery cells is high even in the above-mentioned structure with the result that it is not possible to achieve temperature uniformity of a desired level.

In a battery pack for vehicles, on the other hand, energy density is increased with the increase of required battery capacity, and therefore, the total size of the battery pack is increased. However, a space for the batter pack is not sufficient with the result that a space occupied by flow channels in the battery pack is gradually decreased.

Also, in a conventional battery pack, the width of a cooling flow channel is identical to the width of a battery module or a battery cell. For this reason, the height of the cooling flow channel is decreased so as to increase energy density within the limited size of the battery pack. If the height of the cooling flow channel is decreased, however, pressure applied to the cooling flow channel is increased with the result that flow deviation is increased.

Consequently, there is a high necessity for a technology to fundamentally solve the above-mentioned problems.

DISCLOSURE

Technical Problem

Therefore, the present invention has been made to solve the above problems, and other technical problems that have yet to be resolved.

As a result of a variety of extensive and intensive studies and experiments on a battery pack case, the inventors of the present application have found that, when the battery pack case is configured to have a structure in which the flow channel width of a coolant introduction part and/or the flow channel width of a coolant discharge part is greater than that of each unit cell, it is possible to uniformly distribute a coolant flowing between the unit cells and to reduce pressure difference even when the height of the coolant introduction part and/or the height of the coolant discharge part is decreased, thereby effectively removing heat accumulating between the unit cells and greatly improving the performance and lifespan of the battery. The present invention has been completed based on these findings.

Technical Solution

In accordance with one aspect of the present invention, the above and other objects can be accomplished by the provision of a battery pack case in which a battery module having a plurality of stacked battery cells or unit modules ('unit cells') is mounted, wherein the battery pack case is provided at the upper part and the lower part thereof with a coolant inlet port and a coolant outlet port, respectively, which are directed in opposite directions such that a coolant to cool the unit cells can flow from one side to the other side of the battery module in a direction perpendicular to a cell stacking direction, the battery pack case is further provided with a flow space ('coolant introduction part') extending from the coolant inlet port to the battery module and another flow space ('coolant discharge part') extending from the battery module to the coolant outlet port, and the flow channel width of the coolant introduction part and/or the flow channel width of the coolant discharge part is greater than that of each of the unit cells, thereby achieving uniform distribution of the coolant.

That is, in the battery pack case according to the present invention, the flow channel width of the coolant introduction part and/or the flow channel width of the coolant discharge part is greater than that of each of the unit cells, and therefore, it is possible to minimize pressure difference and flow deviation even when the height of the coolant introduction part and/or the height of the coolant discharge part is decreased, thereby effectively removing heat generated during the charge and discharge of the unit cells through uniform flow of the coolant. Consequently, it is possible to improve cooling efficiency of the battery pack and to improve operational performance of the unit cells.

In the above structure, only the flow channel width of the coolant introduction part or the flow channel width of the coolant discharge part may be greater than that of each of the unit cells, or both the flow channel width of the coolant introduction part and the flow channel width of the coolant discharge part may be greater than that of each of the unit cells, based on the required size of a battery pack.

Preferably, the flow channel width of the coolant introduction part and/or the flow channel width of the coolant discharge part is increased in proportion to the decrease in height of the coolant introduction part and/or the coolant discharge part in a state in which flow of the coolant is uniform. For example, the flow channel width of the coolant introduction part and/or the flow channel width of the coolant discharge part may be equivalent to 105 to 500% of that of each of the unit cells.

Specifically, if the height of the coolant introduction part and/or the height of the coolant discharge part is decreased and the flow channel width of the coolant introduction part and/or the flow channel width of the coolant discharge part is less than 105% of that of each of the unit cells, it is difficult to minimize the pressure difference and flow deviation of the coolant flow channel to a desired level. On the other hand, if the height of the coolant introduction part and/or the height of the coolant discharge part is decreased and the flow channel width of the coolant introduction part and/or the flow channel width of the coolant discharge part is greater than 500% of that of each of the unit cells, the total size of the battery pack case is increased, which is not preferable.

In a preferred example, the battery pack case may be configured to have a structure in which a flow space ('battery module mounting part') extending from the coolant introduction part to the coolant discharge part has a flow channel width greater than that of each of the unit cells so as to cool electrode terminals of the unit cells.

That is, the flow channel width of the battery module mounting part is greater than that of each of the unit cells. Consequently, the coolant flows to regions of the unit cells at which the electrode terminals are located, and therefore, it is possible to effectively cool the electrode terminals of the unit cells.

Particularly, in the above structure, the electrode terminals of the unit cells, which are the portions at which a large amount of heat is generated, are cooled, thereby greatly improving heat removal performance to prevent the electrode terminals from overheating.

In this case, the flow channel width of the battery module mounting part is preferably equivalent to 105 to 500% of that of each of the unit cells.

Specifically, if the flow channel width of the battery module mounting part is less than 105% of that of each of the unit cells, it is difficult to effectively cool the electrode terminals of the desired unit cells. On the other hand, if the flow channel width of the battery module mounting part is greater than 500% of that of each of the unit cells, the total size of the battery pack case is increased, which is not preferable.

The coolant discharge part may have a vertical sectional area equivalent to 100 to 300%, preferably 150 to 250%, of that of the coolant inlet port.

Specifically, if the vertical sectional area of the coolant discharge part is less than 100% of that of the coolant inlet port, flow deviation of the coolant is increased due to pressure difference while the coolant, introduced through the coolant inlet port, passes through the coolant discharge part via the battery module. On the other hand, if the vertical sectional area of the coolant discharge part is greater than 300% of that of the coolant inlet port, the total size of the battery pack case is increased, which is not preferable.

In another example, the upper end inside of the coolant introduction part facing the top of the battery module may be configured to have a structure in which the inclination degree of an incline plane starting from the end of the battery pack case opposite to the coolant inlet port increases toward the coolant inlet port from the top of the battery module.

Since the upper end inside of the coolant introduction part is configured to have a structure in which the inclination degree of the incline plane starting from the end of the battery pack case opposite to the coolant inlet port (the end of the battery pack case at which the coolant outlet port is located) increases toward the coolant inlet port from the top of the battery module, the flux of the coolant flowing in the flow channels between the unit cells (battery cells or unit modules) is uniform, and therefore, it is possible to effectively remove heat generated during the charge and discharge of the unit cells through uniform flow of the coolant.

Here, the expression 'the increase of the inclination degree' means that the incline plane provided at the side at which the coolant inlet port is located has an inclination degree greater than that of the incline plane provided at the side opposite to the coolant inlet port. Consequently, the incline plane may increase continuously or discontinuously toward the coolant inlet port. Here, the expression 'the discontinuous increase' means that a region defined between the incline planes may substantially have an inclination of 0 degrees. For example, a region having an inclination of 0 degrees with respect to the top of the battery module may be partially formed between the neighboring incline planes.

The battery module mounted in the battery pack case according to the present invention is manufactured by stacking a plurality of unit cells with high density. The unit cells are stacked so that neighboring unit cells are spaced apart from each other by a predetermined distance so as to remove heat generated during the charge and discharge of the unit cells. For example, battery cells may be sequentially stacked at predetermined intervals without using an additional member. If the mechanical strength of the battery cells is low, on the other hand, one or more battery cells may be mounted in a predetermined mounting member, and a plurality of mounting members may be stacked to constitute a battery module. In the present invention, the latter is referred to as a 'unit module'.

In a case in which a plurality of unit modules is stacked to constitute a battery module, coolant flow channel may be provided between the battery cells and/or between the unit modules so as to effectively remove heat accumulating between the stacked battery cells.

The coolant introduction part and the coolant discharge part are flow spaces, into which a coolant to effectively remove heat generated from the unit cells during the charge and discharge of the unit cells is introduced and discharged. The coolant introduction part and the coolant discharge part are formed at the upper part and the lower part of the battery pack case, respectively, in opposite directions. According to circumstances, the coolant introduction part and the coolant discharge part are formed at the lower part and the upper part of the battery pack case, respectively. The inclination degree of the incline plane of the upper end inside of the coolant introduction part may increase toward the coolant inlet port in various structures.

In a preferred example, the upper end inside of the coolant introduction part may include two or more continuous incline planes having different inclination degrees from one another. That is, incline planes, the inclination degree of which increases toward the coolant inlet port from the end of the battery pack case opposite to the coolant inlet port, may be formed at the upper end inside of the coolant introduction part.

The experiments carried out by the inventors of the present application revealed that, when the upper end inside of the coolant introduction part was configured to have a structure including two or more incline planes than when the upper end inside of the coolant introduction part was parallel to the top of the battery module or when the upper end inside of the coolant introduction part was configured to have a structure including a single incline plane, temperature deviation between the unit cells was decreased, and therefore, the performance of the unit cells was further improved.

In a concrete example, the incline planes of the upper end inside may include a first incline plane starting from the end of the battery pack case opposite to the coolant inlet port and a second incline plane located between the first incline plane and the coolant inlet port so that the second incline plane has an inclination degree greater than that of the first incline plane.

In the above structure, the second incline plane may have an inclination degree 20 to 500%, preferably 100 to 300%, greater than the inclination degree of the first incline plane within a range in which the inclination degree of the second incline plane does not exceed 45 degrees with respect to the top of the battery module. Since the inclination degree of the second incline plane does not exceed 45 degrees, it is possible to minimize the increase in size of the battery pack case. Also, since the inclination degree of the second incline plane is at least 20% greater than that of the first incline plane, it is possible to secure desirable uniform distribution of the coolant.

The first incline plane may have an inclination of 15 degrees or less with respect to the top of the battery module. Preferably, the first incline plane has an inclination of 2 to 7 degrees with respect to the top of the battery module. More preferably, the first incline plane has an inclination of 3 to 5 degrees with respect to the top of the battery module.

In this case, the second incline plane may have an inclination of 10 to 30 degrees with respect to the top of the battery module within a range in which the inclination degree of the second incline plane is greater than that of the first incline plane.

Meanwhile, the coolant inlet port may have various inclination degrees depending upon conditions of a device in which the middle or large-sized battery pack is mounted. For example, the coolant inlet port may have an inclination degree equal to or less than that of the second incline plane.

According to circumstances, when the inclination degree of the coolant inlet port is required to be large due to the structural limit of the device in which the battery pack is mounted, the coolant inlet port may have an inclination degree equal to or greater than that of the second incline plane.

The inventors of the present application experimentally confirmed that, when the upper end inside of the coolant introduction part was configured to have a specific inclined structure as previously defined, the influence of the inclination degree of the coolant inlet port on the uniform distribution of the coolant in the coolant flow channels was insignificant. Therefore, when the upper end inside of the coolant introduction part is configured to have a specific inclined structure as in the present invention, it is possible to freely decide the inclination degree of the coolant inlet port depending upon the installation conditions of a device.

In a preferred example, the coolant inlet port may have an inclination of 30 to 60 degrees with respect to the top of the battery module within a range in which the coolant inlet port has an inclination degree exceeding that of the second incline plane. Consequently, even when the inclination degree of the coolant inlet port is required to be large depending upon the conditions of a device in which the battery pack is mounted, it is possible to effectively achieve desired cooling efficiency by the provision of the characteristic structure of the upper end inside of the coolant introduction part as described above.

Meanwhile, the end of the battery pack case opposite to the coolant inlet port may be spaced apart from the top of the battery module by a height equivalent to 10% or less of that of the battery module. This structure appropriately restricts the amount of the coolant reaching to the end of the battery pack case opposite to the coolant inlet port, thereby further improving a uniform distribution effect of the coolant with respect to the unit cells.

In this case, the end of the battery pack case opposite to the coolant inlet port is spaced apart from the top of the battery module by a height of approximately 1 to 10 mm, preferably approximately 1 to 3 mm.

Each of the battery cells may be a secondary battery or a fuel cell. Representative examples of the secondary battery may include a nickel metal hydride secondary battery and a lithium secondary battery. Among them, the lithium secondary battery is preferably used because the lithium secondary battery has high energy density and high discharge voltage. Based on its shape, a prismatic battery, a prismatic battery or a pouch-shaped battery is preferably used as a chargeable and dischargeable unit cell constituting the battery module. More preferably, the pouch-shaped battery is used as the unit cell of the battery module because the pouch-shaped battery is manufactured with low manufacturing cost and is light in weight.

Also, the battery pack case according to the present invention is more preferably used in a structure in which the cooling efficiency is serious, i.e., a structure in which the length of the battery pack case corresponding to the unit cell stacking direction is greater than that of the battery pack case corresponding to the lateral direction of the unit cells.

Meanwhile, the coolant discharge part may have a uniform height with respect to the bottom of the battery module. That is, the coolant discharge part may be configured to have a structure in which the lower end inside of the coolant discharge part facing to the bottom of the battery module has a uniform height with respect to the bottom of the battery module. Of course, however, the structure may be partially modified to improve the coolant discharge efficiency.

According to circumstances, the battery pack case may be configured to have a structure in which a blowing fan is further mounted in the coolant outlet port or the coolant outlet port to rapidly and smoothly move the coolant, introduced through the coolant inlet port, to the coolant outlet port, after the coolant flows through the battery module. In this structure, the coolant, introduced through the narrow coolant inlet port, sufficiently reaches the battery cells distant from the coolant inlet port at a high flow speed of the coolant by coolant driving force generated from the blowing fan, and therefore, the relatively uniform distribution of the coolant is achieved under the same coolant flux.

Meanwhile, the battery pack case may include an upper case mounted at the top of the battery module to define the coolant introduction part and a lower case mounted at the bottom of the battery module to define the coolant discharge part, and the upper case and the lower case may be coupled to each other by fastening members.

In the above structure, supporting bars to define the flow channel of the coolant introduction part and packing members to prevent leakage of the coolant may be mounted at upper ends of opposite sides of the coolant introduction part. Specifically, the packing members may be mounted to the top and bottom of each of the supporting bars.

The material for the packing members is not particularly restricted so long as the packing members can prevent leakage of the coolant. For example, the packing members may be formed of rubber or foamed polymer resin.

In the batter pack case, the shape or mounting structure of the supporting bars and the mounting position of the packing members may be changed to provide various structures in which the flow channel width of the coolant introduction part is greater than the flow channel width of each of the unit cells (flow channel width of the battery module).

In a first example, a pair of supporting bars to define the flow channel of the coolant introduction part may be mounted in spaces defined between the upper case and sides of the battery module. In this structure, the flow channel width of the coolant introduction part is greater than in the structure in which the supporting bars are mounted at the upper ends of the opposite sides of the coolant introduction part.

In a second example, a pair of supporting bars to define the flow channel of the coolant introduction part may be formed in the shape of '¬' in vertical section and may be mounted in spaces defined between the upper case and sides of the battery module and at portions of opposite sides of the upper end of the battery module. Specifically, the supporting parts may be configured to enclose the upper end edges of the battery module.

In a third example, supporting bars to define the flow channel of the coolant introduction part may be mounted at opposite sides of the coolant introduction part, and packing members to prevent leakage of the coolant may be mounted in spaces defined between the upper case and sides of the battery module. In this structure, the width of the coolant flow channel may be increased in proportion to the size of the packing members.

Meanwhile, the flow channel width of the coolant discharge part may be greater than the flow channel width of each of the unit cells in various structures. For example, the lower case may be configured to have a bracket structure in which opposite ends of the lower case protrude upward.

In the above structure of the lower case, therefore, it is possible to adjust the distance between the brackets so that the flow channel width of the coolant discharge part is greater than that of each of the unit cells.

In accordance with another aspect of the present invention, there is provided a battery pack configured to have a structure in which a battery module is mounted in the battery pack case with the above-stated construction.

The term 'battery module' used in the specification inclusively means the structure of a battery system configured to have a structure in which two or more chargeable and dischargeable battery cells or unit modules are mechanically coupled and, at the same time, electrically connected to each other to provide high power and high capacity. Therefore, the battery module itself may constitute a single apparatus or a part of a large-sized apparatus. For example, a large number of small-sized battery modules may be connected to each other to constitute a large-sized battery module. Alternatively, a small number of battery cells may be connected to each other to constitute a unit module, and a plurality of the unit modules may be connected to each other.

Meanwhile, the unit module may be configured in various structures, an exemplary example of which will be described hereinafter.

The unit module is configured to have a structure in which a plurality of plate-shaped battery cells, each of which has electrode terminals formed at the upper and lower ends thereof, are connected in series and/or in parallel to each other. The unit module may includes two or more battery cells arranged in a stacked structure in which connections between the electrode terminals of the battery cells are bent and a high strength cell cover coupled to the battery cells to cover outer sides of the battery cells excluding the electrode terminals of the battery cells.

The plate-shaped battery cells are battery cells having a small thickness and relatively large width and length to minimize the entire size of the battery cells when the battery cells are stacked to constitute a battery module. As a preferred example, the battery cell may be a secondary battery configured to have a structure in which an electrode assembly is mounted in a battery case formed of a laminate sheet including a resin layer and a metal layer, and electrode terminals protrude outward from the upper and lower ends of the battery case. Specifically, the battery cell may be configured to have a structure in which an electrode assembly is mounted in a pouch-shaped battery case formed of an aluminum laminate sheet. The secondary battery configured to have the above-described structure may be referred to as a pouch-shaped battery cell.

A unit module may be constituted by covering two or more battery cells with a high strength cell cover made of a synthetic resin or a metallic material. The high strength cell cover restrains the deformation of the battery cells due to repeated expansion and contraction of the battery cells during the charge and discharge of the battery cells, while protecting the battery cells having a low mechanical strength, thereby preventing the separation between sealed regions of the battery cells. Eventually, therefore, it is possible to manufacture a middle or large-sized battery module having more excellent safety.

The battery cells are connected in series and/or parallel to each other in one unit module, or the battery cells of one unit module are connected in series and/or parallel to the battery cells of another unit module. In a preferred example, a plurality of unit modules may be manufactured by coupling electrode terminals of the battery cells to each other in a state in which the battery cells are arranged in series in the longitudinal direction, so that the electrode terminals of the battery cells are successively adjacent to each other, bending two or more battery cells so that the battery cells are stacked, and covering a predetermined number of stacked battery cells with a cell cover.

The coupling between the electrode terminals may be achieved in various manners, such as welding, soldering and mechanical coupling. Preferably, the coupling between the electrode terminals is achieved by welding.

A plurality of battery cells or unit modules, stacked in high integration in a state in which the electrode terminals are connected to each other, are vertically mounted in the separable upper and lower cases that are configured to be coupled to each other, preferably, in the assembly-type coupling structure to constitute the rectangular battery module.

The details of a unit module and a rectangular battery module manufactured with a plurality of unit modules are disclosed in Korean Patent Application No. 2006-45443 and No. 2006-45444, which have been filed in the name of the applicant of the present application and the disclosure of which is incorporated herein by reference.

The battery pack according to the present invention is preferably used as a power source for electric vehicles, hybrid electric vehicles or plug-in hybrid electric vehicles, the safety of which may seriously deteriorate due to high heat generated from a plurality of unit cells combined to provide high power and high capacity, during the charge and discharge of the unit cells.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
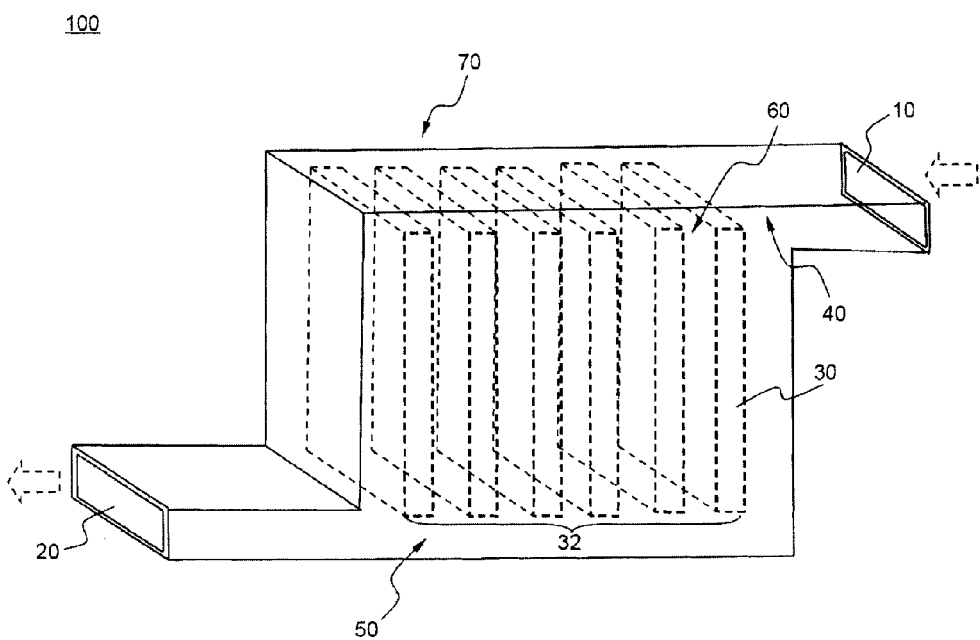
FIG. 1 is a perspective view showing a battery pack configured to have a structure in which a battery module is mounted in a conventional battery pack case.
Figure 2:
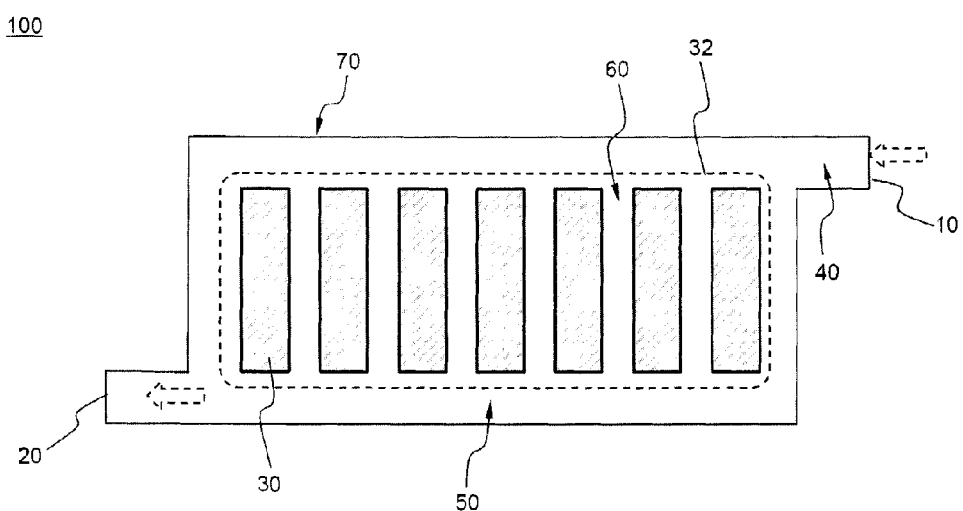
FIG. 2 is a vertical sectional view typically showing the battery pack of FIG. 1.

FIG. 1 is a perspective view typically showing a battery pack configured to have a structure in which a battery module is mounted in a conventional battery pack case, and FIG. 2 is a vertical sectional view typically showing the battery pack in which the battery module is mounted in the battery pack case of FIG. 1.

Referring to these drawings, a battery pack 100 includes a battery module 32 configured to have a structure in which a plurality of unit cells 30 is stacked so that the unit cells 30 are electrically connected to each other, a battery pack case 70 in which the battery module 32 is mounted, a coolant introduction part 40, as a flow space, extending from a coolant inlet port 10 to the battery module 32, and a coolant discharge part 50, as another flow space, extending from the battery module 32 to a coolant outlet port 20.

A coolant, introduced through the coolant inlet port 10, flows through the coolant introduction part 40 and flow channels 60 defined between the respective unit cells 30. At this time, the coolant cools the unit cells 30. After that, the coolant flows through the coolant discharge part 50 and is then discharged from the battery pack case through the coolant outlet port 20.

The coolant introduction part 40 is formed in parallel to the direction in which the unit cells 30 are stacked. In the above structure, a relatively high coolant flux is introduced into the flow channels defined between the unit cells 30 adjacent to the coolant outlet port 20, whereas a relatively low coolant flux is introduced into the flow channels defined between the unit cells 30 adjacent to the coolant inlet port 10, with the result that the cooling of the unit cells 30 is not uniformly achieved, and therefore, the temperature deviation between the unit cells adjacent to the coolant outlet port 20 and the unit cells adjacent to the coolant inlet port 10 is very high. This phenomenon occurs because the coolant is concentrated at the side at which the coolant outlet port 20 is located with the result that the temperature of the side at which the coolant inlet port 10 is located increases.

Figure 3:
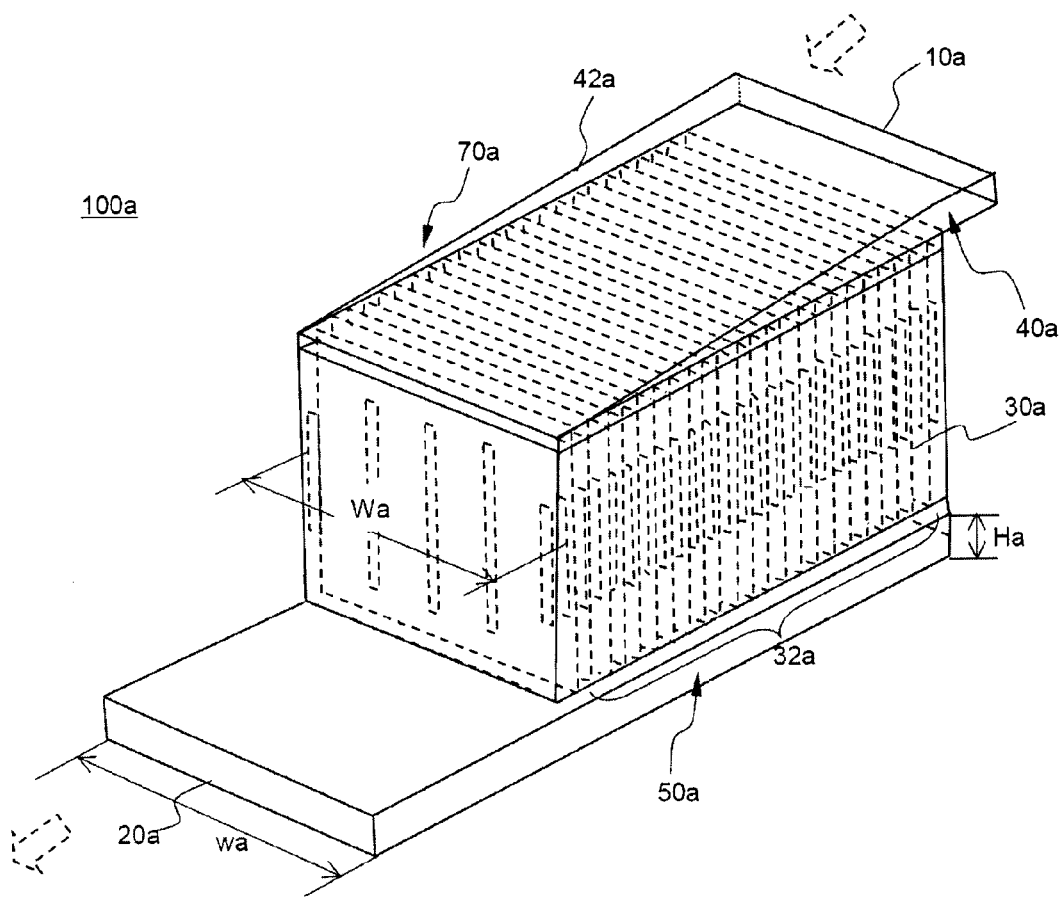
FIG. 3 is a perspective view showing a battery pack configured to have a structure in which a battery module is mounted in a battery pack case according to an embodiment of the present invention configured so that the flow channel width of a coolant discharge part is greater than that of each unit module.

FIG. 3 is a perspective view typically showing a battery pack configured to have a structure in which a battery module is mounted in a battery pack case according to an embodiment of the present invention configured so that the flow channel width of a coolant discharge part is greater than that of each unit module.

In a battery pack 100a of FIG. 3, a coolant inlet port 10a and a coolant outlet port 20a are disposed at the upper part and the lower part of a battery pack case 70a, respectively, in opposite directions so that a coolant to cool unit modules 30a can flow from one side to the other side of the battery module 32a in the direction perpendicular to the cell stacking direction. The battery module 32a includes 24 unit modules 30a which are stacked in the lateral direction.

A coolant introduction part 40a, as a flow space, extending from the coolant inlet port 10a to the battery module 32a, and a coolant discharge part 50a, as another flow space, extending from the battery module 32a to the coolant outlet port 20a are formed at the upper part and the lower part of the battery pack case 70a, respectively.

Also, the flow channel width wa of the coolant discharge part 50a is equivalent to approximately 110% of the flow channel width Wa of each unit module 30a, and the upper end inside 42a of the coolant introduction part 40a is inclined at a predetermined angle (specifically 5 degrees) toward the end of the battery pack case opposite to the coolant inlet port 10a.

Figure 4:
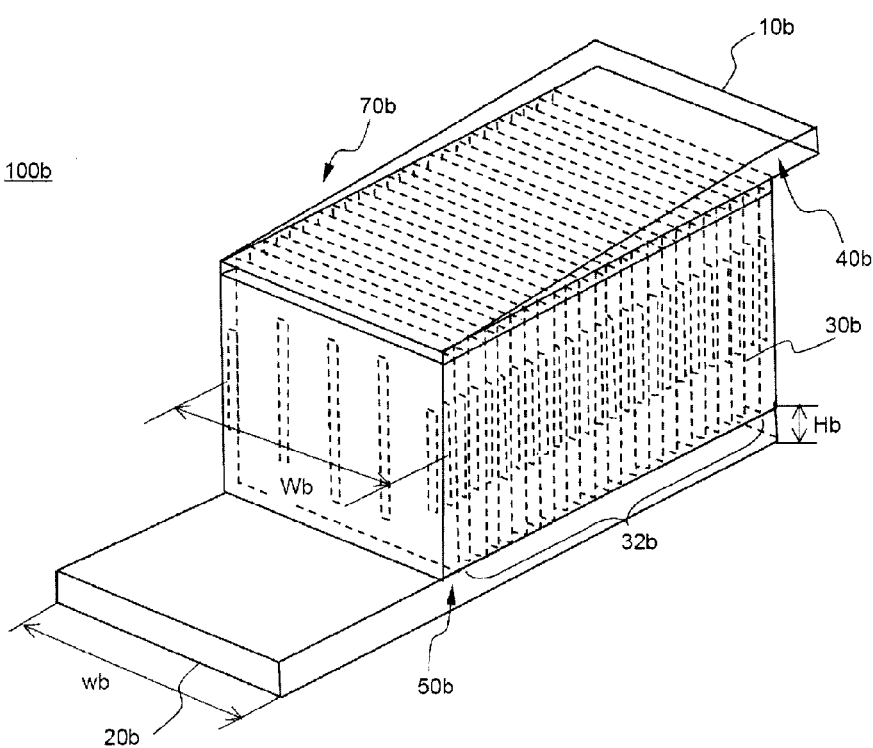
FIG. 4 is a perspective view showing a battery pack (comparative example) different from the battery pack of FIG. 3 in that the flow channel width of a coolant discharge part is equal to that of each unit module.

FIG. 4 is a perspective view typically showing a battery pack, as a comparative example, different from the battery pack of FIG. 3 in that the flow channel width of a coolant discharge part is equal to that of each unit module.

A battery pack 100b of FIG. 4 is identical to the battery pack 100a of FIG. 3 except that the flow channel width wb of a coolant discharge part 50b is equal to the flow channel width Wb of each unit module 30b, and therefore, a detailed description thereof will be omitted.

Figure 5:
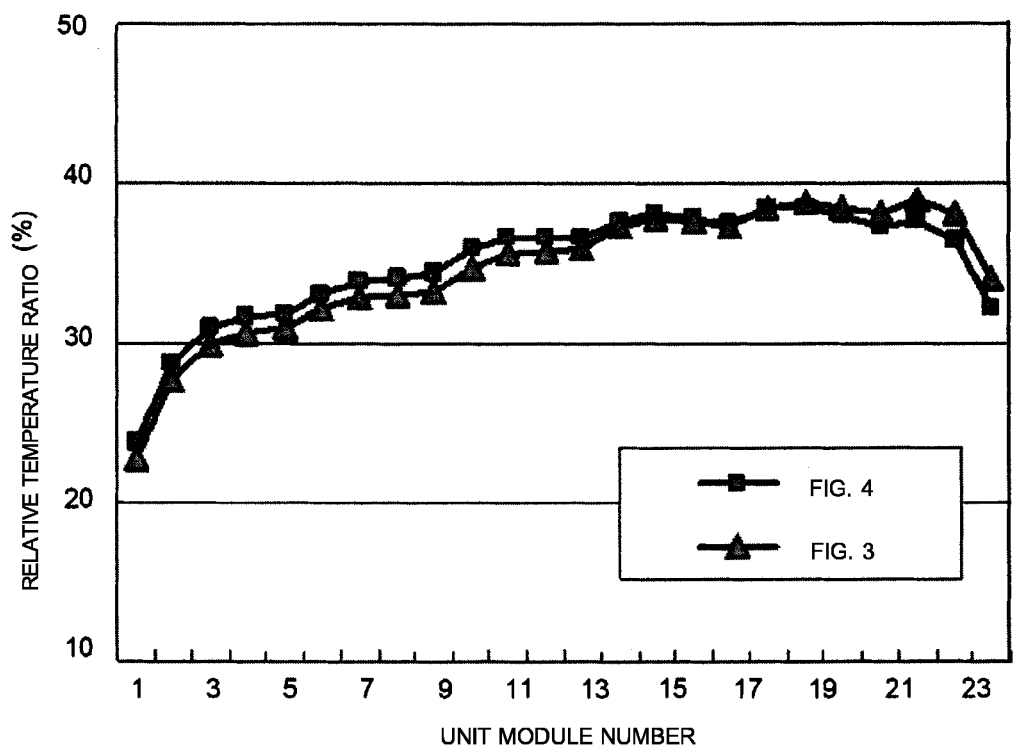
FIG. 5 is a graph showing the measurement results of the change in temperature of the unit modules in the battery packs of FIGS. 3 and 4.

FIG. 5 is a graph showing the measurement results of the change in temperature of the unit modules in the battery packs of FIGS. 3 and 4.

FIG. 5 shows the measurement results of the temperature of the unit modules 30a and 30b stacked in the battery pack cases 70a and 70b of FIGS. 3 and 4 from the unit module adjacent to the coolant outlet ports 20a and 20b to the unit module adjacent to the coolant inlet ports 10a and 10b. That is, unit module number 1 indicates the unit module adjacent to the coolant outlet port 20a or 20b, and unit module number 24 indicates the unit module adjacent to the coolant inlet port 10a or 10b.

The temperature measurement experiments were carried out under conditions in which a predetermined load was applied to the unit modules and external temperature was maintained at room temperature. For the battery pack 100a of FIG. 3, the measurement experiments revealed that unit module number 1, i.e. the unit module adjacent to the end of the batter pack case opposite to the coolant inlet port 10a, had a relative temperature ratio of 22%, and unit module number 23 had a relative temperature ratio of 39%. That is, the temperature deviation between the unit modules was 17%. For the battery pack 100b of FIG. 4, the measurement experiments revealed that unit module number 1, i.e. the unit module adjacent to the end of the batter pack case opposite to the coolant inlet port 10b, had a relative temperature ratio of 23%, and unit module number 20 had a relative temperature ratio of 39%. That is, the temperature deviation between the unit modules was 19%.

In comparison between the battery pack 100a of FIG. 3 and the battery pack 100b of FIG. 4, the temperature deviation between the unit modules of FIG. 3 was almost equal to the temperature deviation between the unit modules of FIG. 4 since the height Ha of the coolant discharge part of FIG. 3 was equal to the height Hb of the coolant discharge part of FIG. 4; however, the pressure difference of the battery pack 100a of FIG. 3 was approximately 10% lower than that of the battery pack 100b of FIG. 4 since the flow channel width wa of the coolant discharge part 50a of FIG. 3 was equivalent to 110% of the flow channel width wb of the coolant discharge part 50b of FIG. 4.

Figure 6:
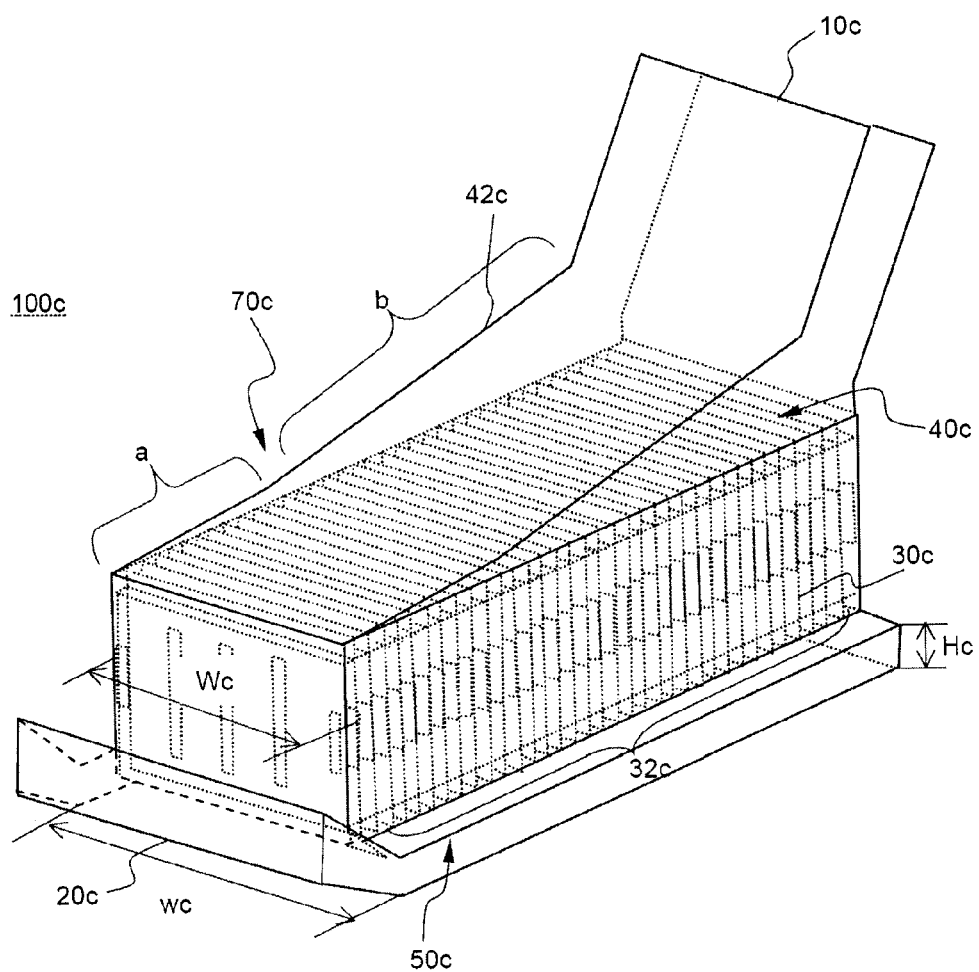
FIG. 6 is a perspective view showing a battery pack configured to have a structure in which a battery module is mounted in a battery pack case according to another embodiment of the present invention configured so that the flow channel width of a coolant discharge part and a coolant outlet port is greater than that of each unit module.

FIG. 6 is a perspective view typically showing a battery pack configured to have a structure in which a battery module is mounted in a battery pack case according to another embodiment of the present invention configured so that the flow channel width of a coolant discharge part and a coolant outlet port is greater than that of each unit module.

Referring to FIG. 6, a battery pack 100c has a battery module 32c mounted in a battery pack case 70c configured so that the flow channel width we of a coolant discharge part 50c and a coolant outlet port 20c is greater than the flow channel width Wc of each unit module 30c. The battery module 32c includes 36 unit modules 30c which are stacked in the lateral direction.

Also, the flow channel width we of the coolant discharge part 50c and the coolant outlet port 20c is equivalent to approximately 130% of the flow channel width Wc of each unit module 30c.

The upper end inside 42c of the coolant introduction part 40c is configured to have a structure in which the inclination degree of an incline plane starting from the end of the battery pack case 70c opposite to a coolant inlet port 10c increases toward the coolant inlet port 10c from the top of the battery module 32c. The upper end inside 42c of the coolant introduction part 40c includes a first incline plane a starting from the end of the battery pack case 70c opposite to the coolant inlet port 10c and a second incline plane b provided between the first incline plane a and the coolant inlet port 10c so that the second incline plane b has an inclination degree greater than that of the first incline plane a.

When a coolant, introduced through the coolant inlet port 10c, flows through the coolant introduction part 40c along the first incline plane a and the second incline plane b, the flow sectional area of the coolant is gradually decreased by the incline planes a and b, the inclination degree of which decreases according to the increase of the distance from the coolant inlet port 10*c*. As a result, the flow speed of the coolant is gradually increased but the coolant flux is decreased, and therefore, a uniform coolant flux is introduced into the respective flow channels while the coolant reaches the unit cells 30*c* distant from the coolant inlet port 10*c*.

In order to achieve uniform distribution of the coolant, the first incline plane a and the second incline plane b are formed at the upper end inside 42*c* of the coolant introduction part 40*c* so that the first incline plane a has an inclination of approximately 5 degrees with respect to the top of the battery module and the second incline plane b has an inclination degree equivalent to 200% of the inclination degree of the first incline plane a, i.e. an inclination of approximately 10 degrees with respect to the top of the battery module.

Meanwhile, the coolant inlet port 10*c* has an inclination of 30 degrees, which is greater than that of the second incline plane b, which is 10 degrees. Consequently, as the coolant, introduced through the coolant inlet port 10*c*, passes through a point at which the second incline plane b starts, the flow speed of the coolant gradually increases until the coolant reaches the end of the battery pack case 70*c* opposite to the coolant inlet port 10*c*. As a result, not only the unit modules adjacent to the coolant inlet port 10*c* but also the unit modules distant from the coolant inlet port 10*c* are uniformly cooled.

Also, the battery pack case 70*c* is configured to have a structure in which the coolant introduction part 40*c* is inclined stepwise so that the inclination degree of the coolant introduction part 40*c* gradually decreases toward the end of the battery pack case 70*c* opposite to the coolant inlet port 10*c*. Consequently, it is possible to prevent the occurrence of a phenomenon in which the coolant flux is concentrated at the side at which the coolant outlet port 20*c* is located, and therefore, it is possible to effectively prevent the increase in temperature of the unit modules 30*c* adjacent to the coolant inlet port 10*c*.

Figure 7:
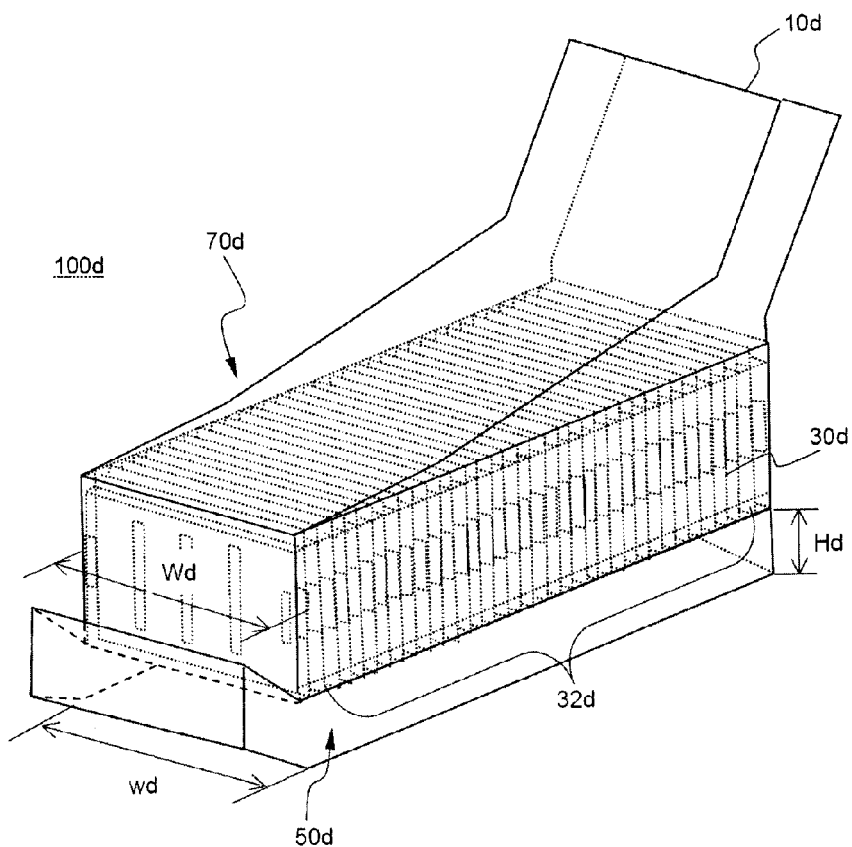
FIG. 7 is a perspective view showing a battery pack (comparative example) different from the battery pack of FIG. 6 in that the flow channel width of a coolant discharge part is equal to that of each unit module, and the height of the coolant discharge part is greater than that of the coolant discharge part of FIG. 6.

FIG. 7 is a perspective view typically showing a battery pack, as a comparative example, different from the battery pack of FIG. 6 in that the flow channel width of a coolant discharge part is equal to that of each unit module, and the height of the coolant discharge part is greater than that of the coolant discharge part of FIG. 6.

Referring to FIG. 7, a battery pack 100*d* is configured to have a structure in which the flow channel width wd of a coolant discharge part 50*d* is equal to the flow channel width Wd of each unit module 30*d*, and the height Hd of the coolant discharge part 50*d* is equivalent to 130% of the height He of the coolant discharge part of FIG. 6.

Figure 8:
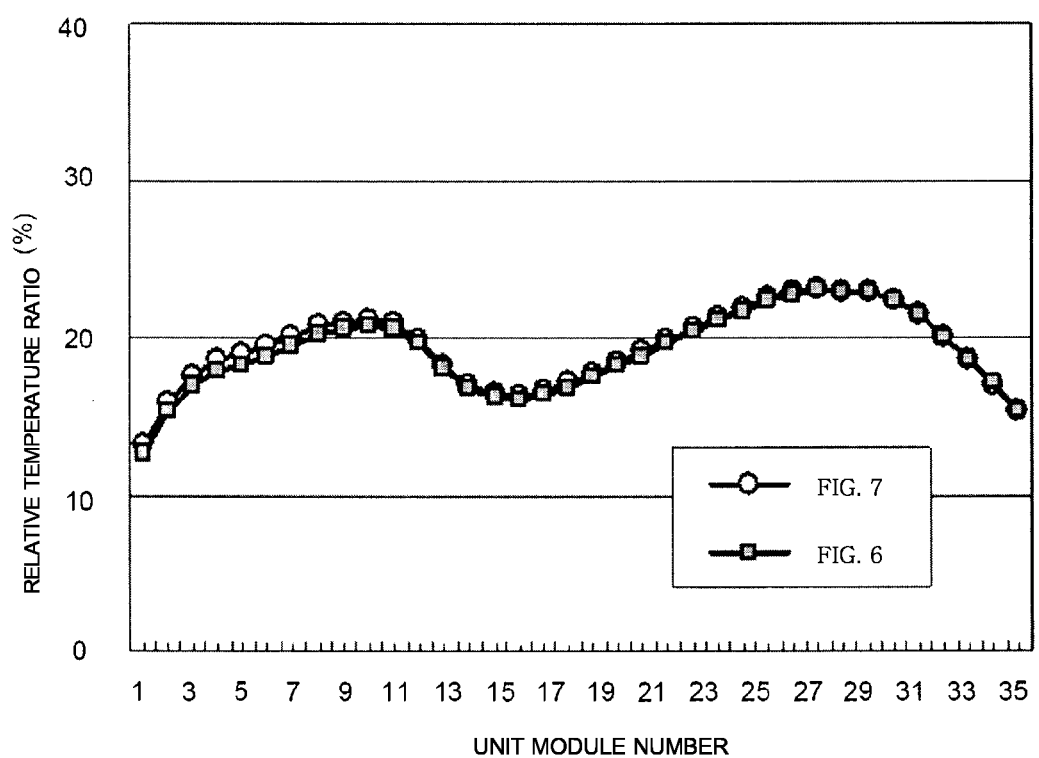
FIG. 8 is a graph showing the measurement results of the change in temperature of the unit modules in the battery packs of FIGS. 6 and 7.

FIG. 8 is a graph showing the measurement results of the change in temperature of the unit modules in the battery packs of FIGS. 6 and 7.

Referring to FIG. 8 together with FIGS. 6 and 7, unit module number 1 of the battery pack 100*c* of FIG. 6, i.e. the unit module adjacent to the end of the batter pack case opposite to the coolant inlet port 10*c*, had a relative temperature ratio of approximately 13%, and unit module number 28 had a relative temperature ratio of approximately 23%. That is, the temperature deviation between the unit modules 30*c* was approximately 10%. On the other hand, unit module number 1 of the battery pack 100*d* of FIG. 7, i.e. the unit module adjacent to the end of the batter pack case opposite to the coolant inlet port 10*d*, had a relative temperature ratio of approximately 13.5%, and unit module number 28 had a relative temperature ratio of approximately 23%. That is, the temperature deviation between the unit modules 30*d* was approximately 9.5%.

In comparison between the battery pack 100*c* of FIG. 6 and the battery pack 100*d* of FIG. 7, the temperature deviation between the unit modules of FIG. 6 was almost equal to the temperature deviation between the unit modules of FIG. 7, and the pressure difference of the battery pack 100*c* of FIG. 6 was equal to that of the battery pack 100*d* of FIG. 7. This is because the height Hc of the coolant discharge part 50*c* of the battery pack 100*c* of FIG. 6 is less than the height Hd of the coolant discharge part 50*d* of the battery pack 100*d* of FIG. 7; however, the flow channel width we of the coolant discharge part 50*c* is formed in the lateral direction to be greater than the flow channel width We of the battery module 32*c* with the result that the inner space area of the coolant discharge part 50*c* of FIG. 6 is equal to that of the coolant discharge part 50*d* of FIG. 7.

Figure 9:
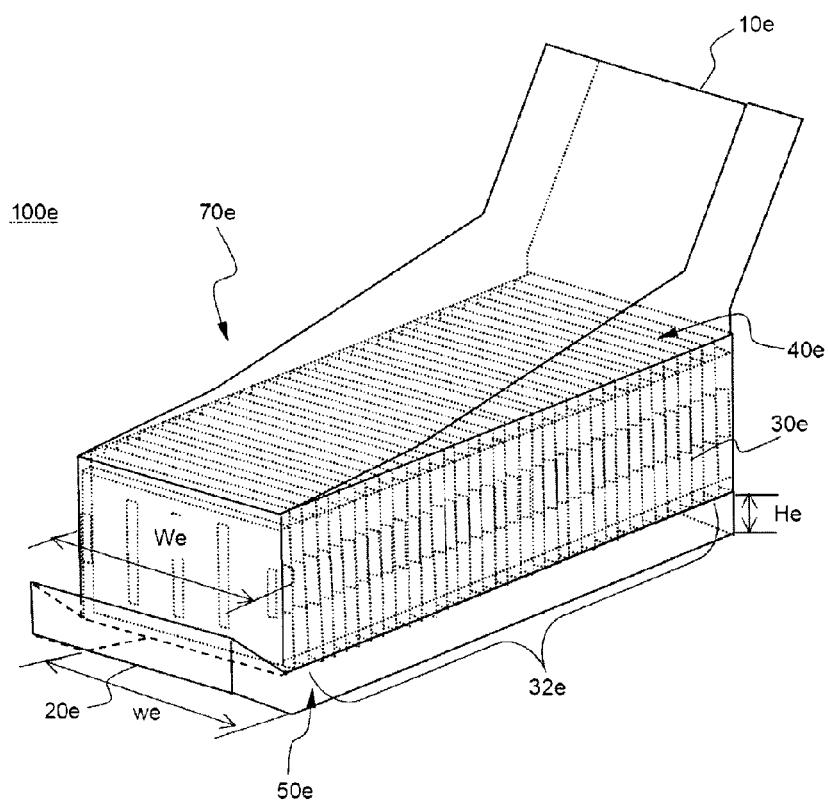
FIG. 9 is a perspective view showing a case in which the flow channel width of the coolant discharge part and the coolant outlet port is equal to that of each unit module in the battery pack of FIG. 6.

FIG. 9 is a perspective view typically showing a case, as a comparative example, in which the flow channel width of the coolant discharge part and the coolant outlet port is equal to that of each unit module in the battery pack of FIG. 6.

A battery pack 100*e* of FIG. 9 is identical to the battery pack 100*c* of FIG. 6 except that the flow channel width we of a coolant discharge part 50*e* and a coolant outlet port 20*e* is equal to the flow channel width We of each unit module 30*e*, and therefore, a detailed description thereof will be omitted.

Figure 10:
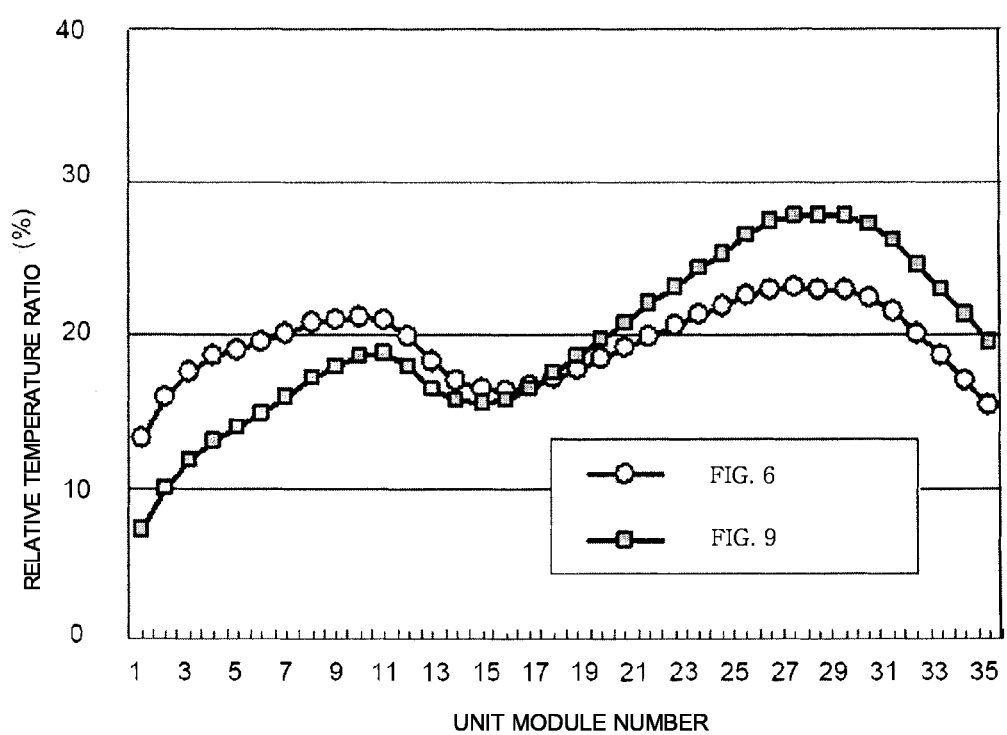
FIG. 10 is a graph showing the measurement results of the change in temperature of the unit modules in the battery packs of FIGS. 6 and 9.

FIG. 10 is a graph showing the measurement results of the change in temperature of the unit modules in the battery packs of FIGS. 6 and 9.

Referring to FIG. 10 together with FIGS. 6 and 9, unit module number 1 of the battery pack 100*c* of FIG. 6, i.e. the unit module adjacent to the end of the batter pack case opposite to the coolant inlet port 10*c*, had a relative temperature ratio of approximately 13%, and unit module number 28 had a relative temperature ratio of approximately 23%. That is, the temperature deviation between the unit modules 30*c* was approximately 10%. On the other hand, unit module number 1 of the battery pack 100*e* of FIG. 9, i.e. the unit module adjacent to the end of the batter pack case opposite to the coolant inlet port 10*e*, had a relative temperature ratio of approximately 7%, and unit module number 28 had a relative temperature ratio of approximately 28%. That is, the temperature deviation between the unit modules 30*e* was approximately 21%.

In comparison between the battery pack 100*c* of FIG. 6 and the battery pack 100*e* of FIG. 9, the temperature deviation between the unit modules of FIG. 9 was 18% greater than the temperature deviation between the unit modules of FIG. 6, and the pressure difference of the battery pack 100*e* of FIG. 9 was 30% greater than that of the battery pack 100*c* of FIG. 6. This is because the height He of the coolant discharge part 50*e* of the battery pack 100*e* of FIG. 9 is 30% less than the height Hd of the coolant discharge part 50*d* of the battery pack 100*d* of FIG. 7; however, the flow channel width we of the coolant discharge part 50*e* is formed not to be 130% greater than the flow channel width We of each unit module 30*e* 32*c* like the battery pack 100*c* of FIG. 6 with the result that the inner area of the coolant discharge part 50*e* of FIG. 9 is less than that of the coolant discharge part 50*c* of FIG. 6.

Figure 11:
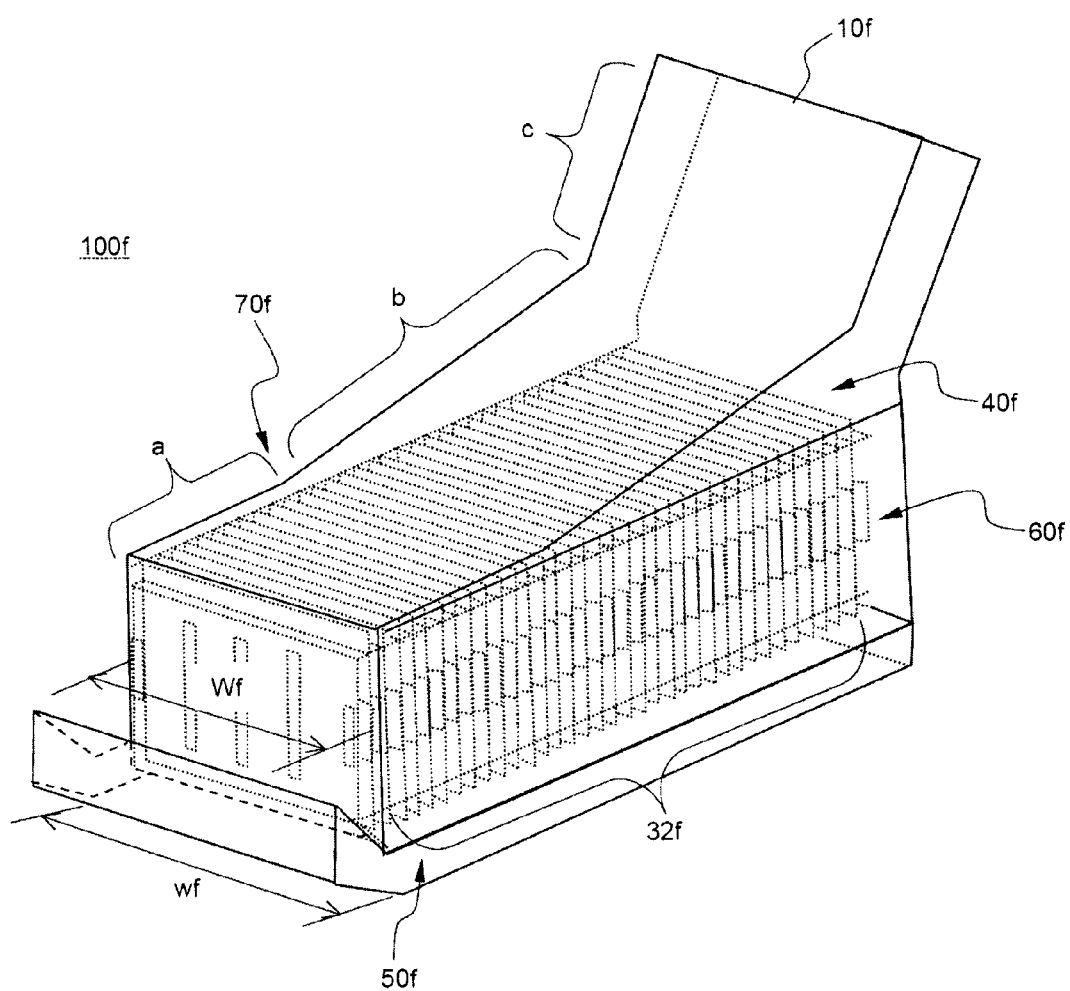
FIG. 11 is a perspective view showing a battery pack configured to have a structure in which a battery module is mounted in a battery pack case according to another embodiment of the present invention.
Figure 12:
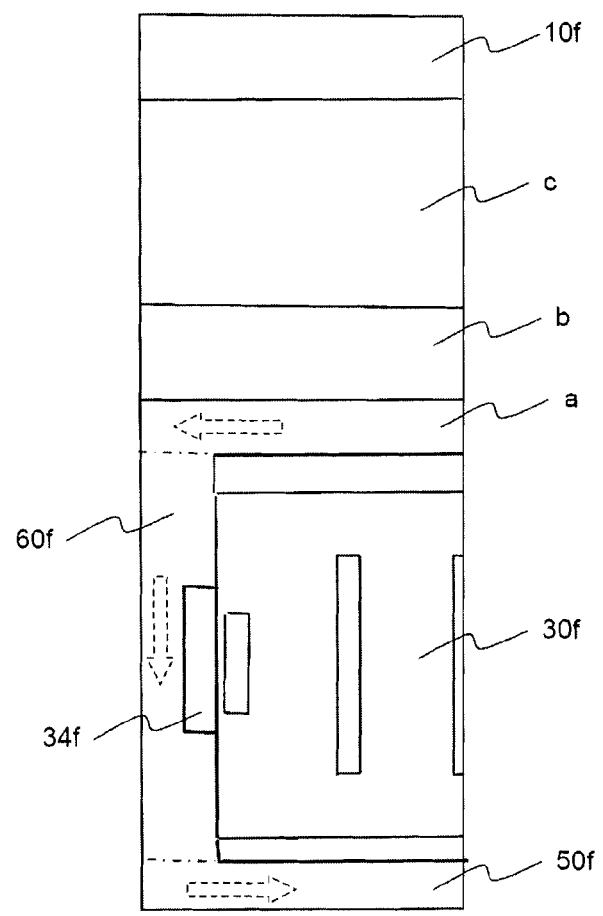
FIG. 12 is a partial vertical sectional view of FIG. 11.

FIG. 11 is a perspective view typically showing a battery pack configured to have a structure in which a battery module is mounted in a battery pack case according to another embodiment of the present invention, and FIG. 12 is a partial vertical sectional view of FIG. 11.

Referring to these drawings, a battery pack 100*f* of FIG. 11 is configured to have a structure in which the flow channel width wf of a coolant introduction part 40*f* and a coolant discharge part 50*f* is equivalent to 130% of the flow channel width Wf of each unit module 30*f*, and therefore, the pressure difference of the battery pack 100f is 30% decreased in proportion to the increase of the flow channel width wf of the coolant discharge part 50f.

Also, the flow channel width of a battery module mounting part 60f, i.e. a flow space, extending from the coolant introduction part 40f to the coolant discharge part 50f is formed to be 130% greater than the flow channel width Wf of each unit module 30f like the flow channel width wf of the coolant introduction part 40f and the coolant discharge part 50f. Consequently, electrode terminals 34f of the unit modules 30f are effectively cooled, thereby preventing the electrode terminals 34f from overheating.

FIGS. 13 to 16 are vertical sectional views typically showing battery packs according to other embodiments of the present invention.

Figure 13:
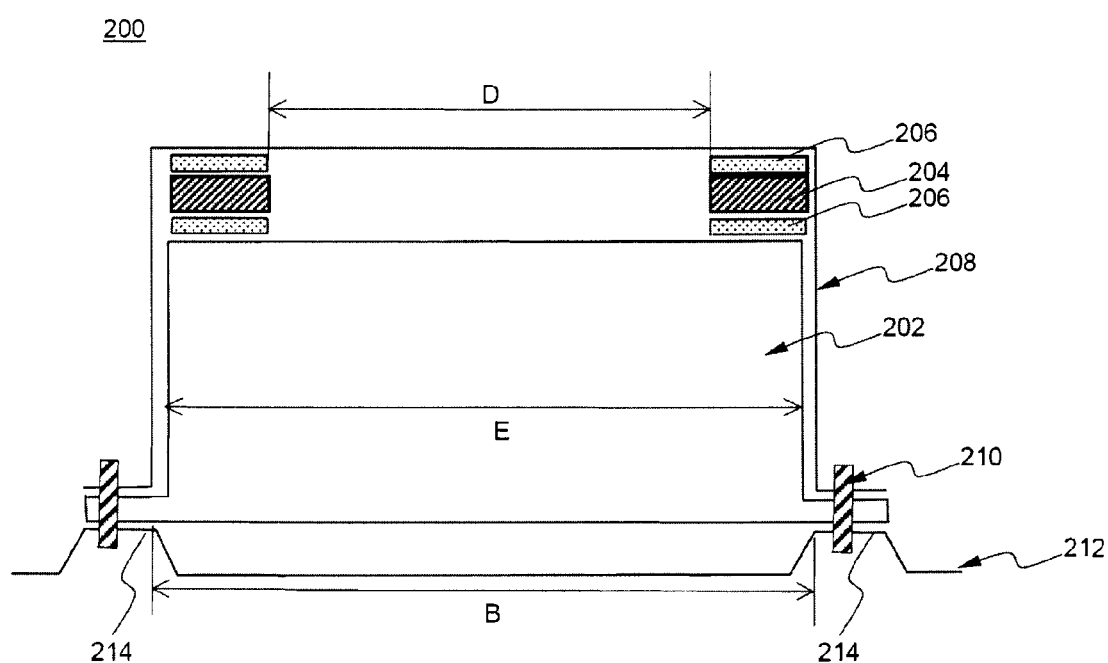
FIGS. 13 to 16 are vertical sectional views typically showing battery packs according to other embodiments of the present invention.

Referring to these drawings, a battery pack 200 of FIG. 13 is configured to have a structure in which a pack case includes an upper case 208 mounted at the top of a battery module 202 to define a coolant introduction part and a lower case 212 mounted at the bottom of the battery module 202 to define a coolant discharge part, and the upper case 208 and the lower case 212 are coupled to each other by fastening members 210.

Also, supporting bars 204 to define the flow channel of the coolant introduction part and packing members 206 to prevent leakage of a coolant are mounted at upper ends of opposite sides of the coolant introduction part. The packing members 206 are mounted to the top and bottom of each of the supporting bars 204.

The flow channel width E of the battery module 202 is set to be greater than the flow channel width D of the coolant introduction part and less than the flow channel width B of the coolant discharge part.

Figure 14:
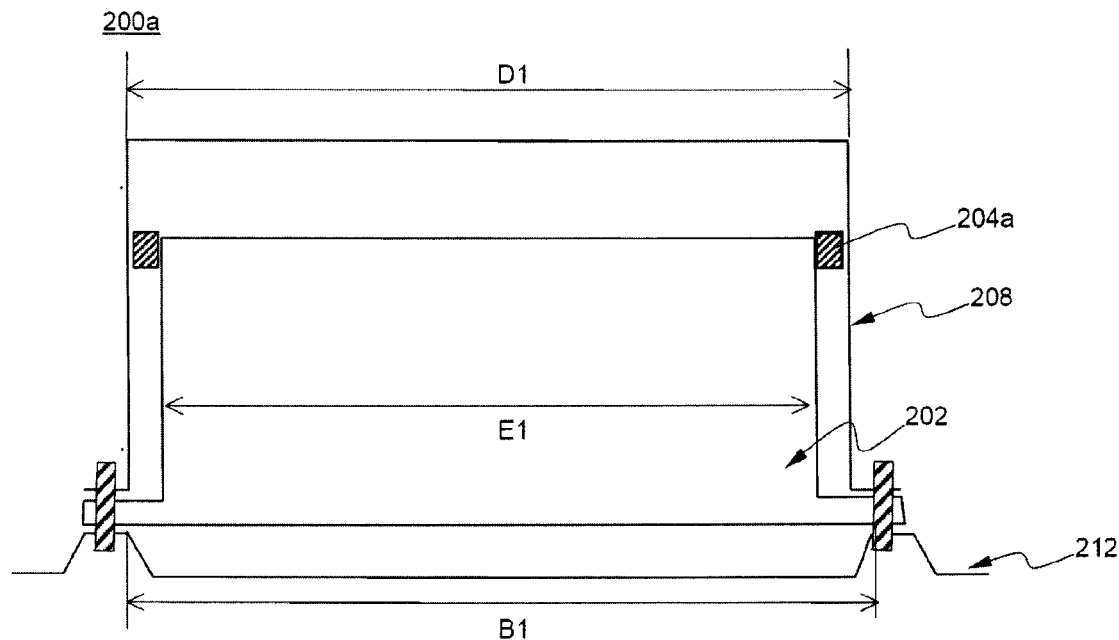

A battery pack 200a of FIG. 14 is configured to have a structure in which a pair of supporting bars 204a to define the flow channel of a coolant introduction part is mounted in spaces defined between an upper case 208 and sides of a battery module 202, and the flow channel width E1 of the battery module 202 is less than the flow channel width D1 of the coolant introduction part and the flow channel width B1 of a coolant discharge part.

According to circumstances, packing members (not shown) may be further mounted between the supporting bars 204a and the upper case 208 and/or between the supporting bars 204a and the battery module 202.

Figure 15:
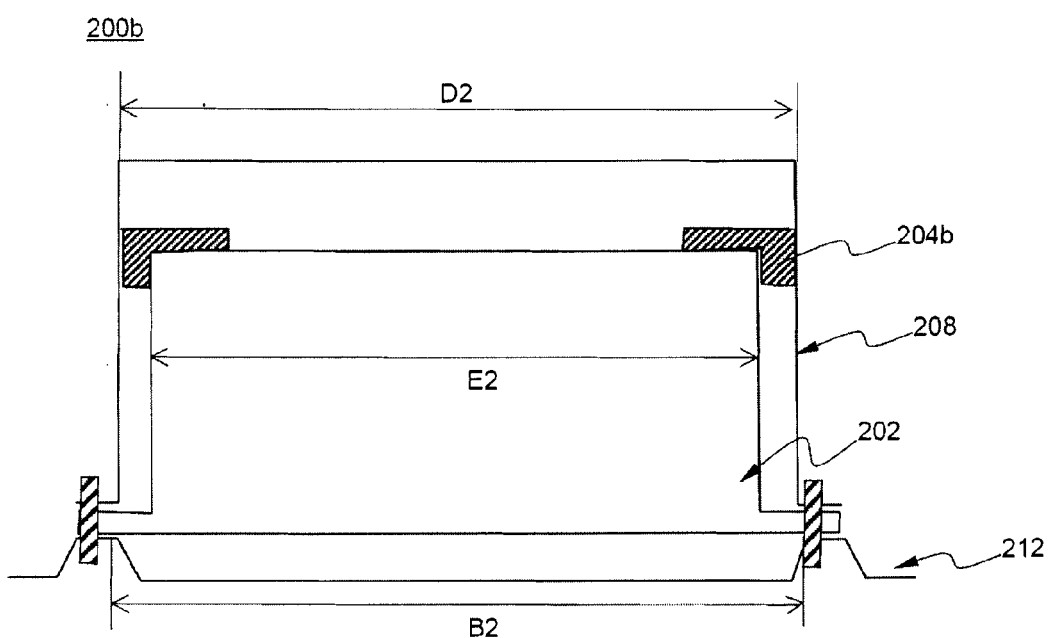

A battery pack 200b of FIG. 15 is configured to have a structure in which a pair of supporting bars 204b to define the flow channel of a coolant introduction part is formed in the shape of '¬' in vertical section and is mounted in spaces defined between an upper case 208 and sides of a battery module 202 and at portions of opposite sides of the upper end of the battery module 202. Specifically, the supporting parts 204b are configured to enclose the upper end edges of the battery module 202.

In this structure, the supporting bars 204b mounted at the portions of opposite sides of the upper end of the battery module 202 are spaced apart from the upper case 208, and therefore, the supporting bars 204b do not substantially affect the coolant flow channel.

Consequently, the flow channel width E2 of the battery module 202 is set to be less than the flow channel width D2 of the coolant introduction part and the flow channel width B2 of the coolant discharge part.

According to circumstances, packing members (not shown) may be further mounted between the supporting bars 204b and the upper case 208 and/or between the supporting bars 204b and the battery module 202 at the side of the battery module 202.

Figure 16:
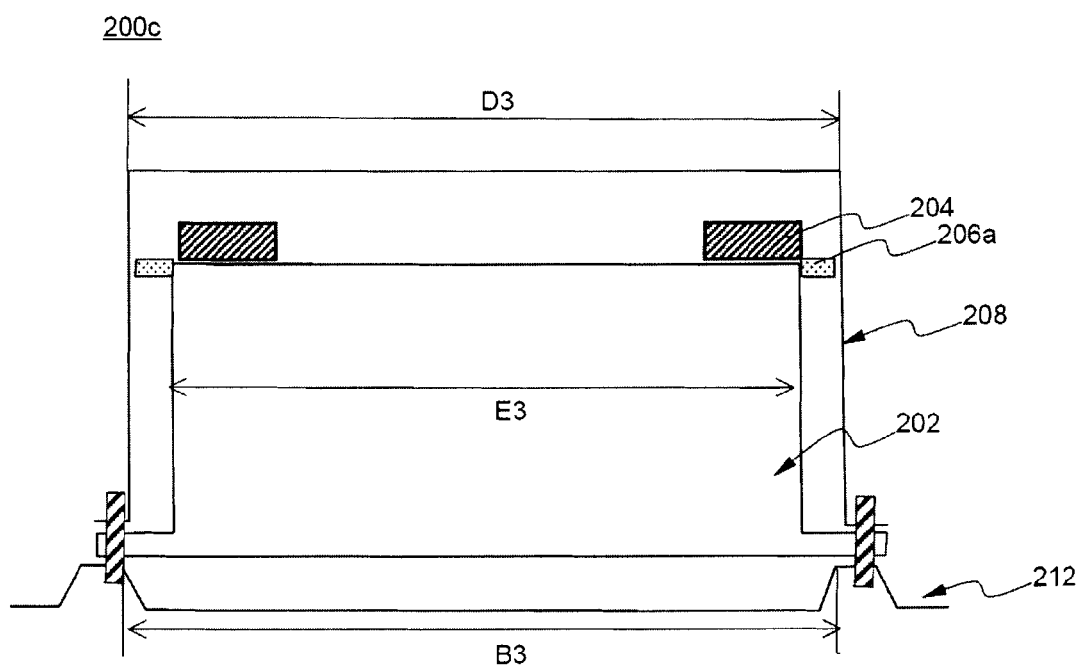

A battery pack 200c of FIG. 16 is configured to have a structure in which supporting bars 204 to define the flow channel of the coolant introduction part are mounted at opposite sides of a coolant introduction part, and packing members 206a to prevent leakage of a coolant are mounted in spaces defined between an upper case 208 and sides of a battery module 202.

In this structure, the supporting bars 204 of the battery module 202 are spaced apart from the upper case 208, and therefore, the supporting bars 204 do not substantially affect the coolant flow channel.

Consequently, the flow channel width E3 of the battery module 202 is set to be less than the flow channel width D3 of the coolant introduction part and the flow channel width B3 of a coolant discharge part.

Meanwhile, in the battery packs of FIGS. 13 to 16, the lower case 212 is configured to have a bracket structure in which opposite ends of the lower case 212 protrude upward. Consequently, the distance between the brackets is increased, and therefore, it is possible to set the flow channel width of the coolant discharge part so that the flow channel width of the coolant discharge part is greater than that of the battery module.

Figure 17:
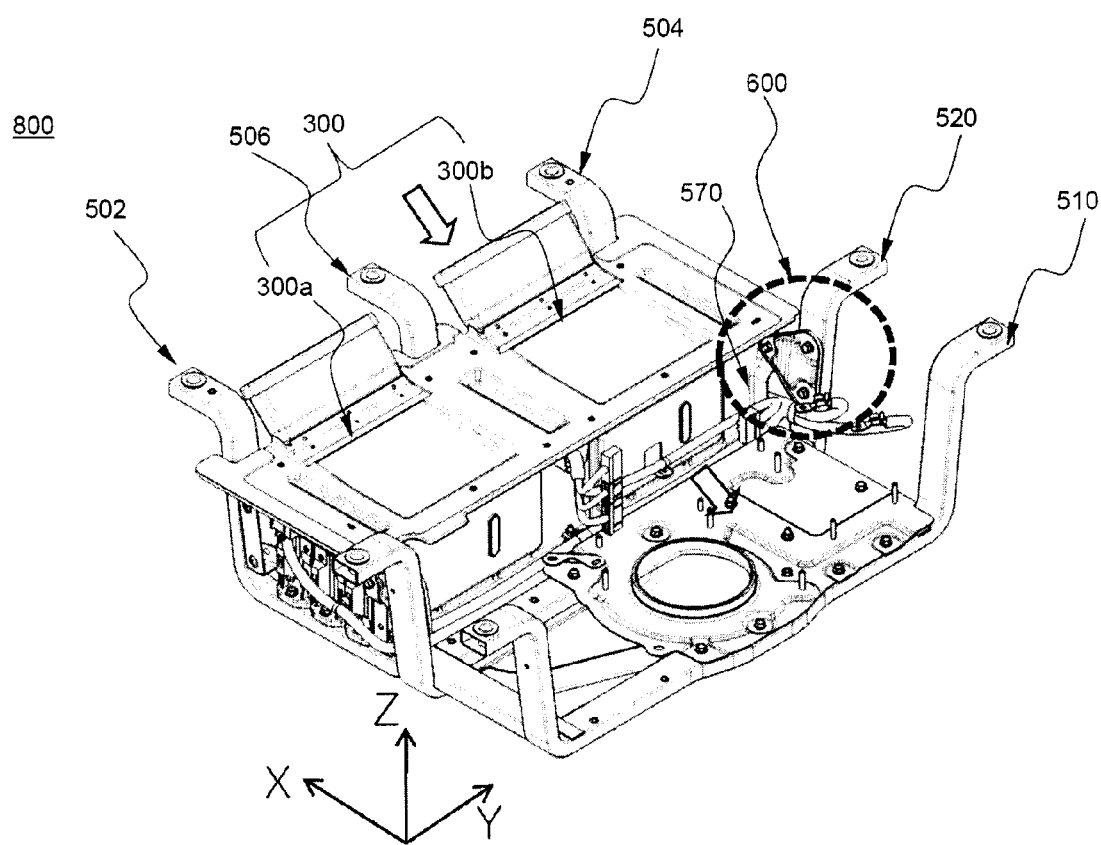
FIG. 17 is a perspective view showing an exemplary battery pack to which the battery pack structure of FIG. 3 is applied.

FIG. 17 is a perspective view typically showing an exemplary battery pack to which the battery pack structure of FIG. 3 is applied.

Referring to FIG. 17, a battery pack 800 includes a battery module array 300, a pair of side support members, i.e. a front support member 570 and a rear support member (not shown), a lower end support member (not shown), three first upper mounting members 502, 504 and 506, a second mounting member 510, and a rear mounting member 520.

A triangular bracket 600 is coupled between the front support member 570 and the rear mounting member 520 to distribute load of the battery module to the rear mounting member 520 via the front support member 570.

The battery module array 300 is configured so that battery modules 300a and 300b, each of which includes unit modules stacked in a state in which the unit modules are turned over, are arranged in two rows. The front support member 570 and the rear support member (not shown) support the front and rear of the battery module array 300, respectively, in a state in which the front support member 570 and the rear support member (not shown) are in tight contact with the outermost battery modules of the battery module array 300.

The lower end support member (not shown) is coupled to the lower ends of the front support member 570 and the rear support member (not shown) to support the lower end of the battery module array 300.

Also, the first upper mounting members 502, 504 and 506 are coupled to the upper ends of the front support member 570 and the rear support member (not shown) and the lower ends of the overturned battery modules 300a and 300b. One end of each of the first upper mounting members 502, 504 and 506 is fastened to an external device.

The front mounting member 510 is configured to have a U-shaped frame structure. The front mounting member 510 is located in front of the battery module array 300. Opposite ends of the front mounting member 510 are fastened to an external device (for example, a vehicle).

One end of the triangular bracket 600 at one side thereof is coupled to the front support member 570, and opposite ends of the triangular bracket 600 at the other side thereof is coupled to the rear mounting member 520.

Consequently, the rear mounting member 520 coupled via the triangular bracket 600 partially support load of the battery pack.

Also, the battery pack is configured to have a structure in which a coolant is introduced through the right upper end of the battery module array 300 to cool the battery cells and is then discharged through the left lower end of the battery module array 300.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery pack case according to the present invention is configured to have a structure in which the width of the coolant introduction part and/or the width of the coolant discharge part is greater than the width of each unit cell to reduce pressure difference even when the height of the coolant introduction part and/or the height of the coolant discharge part is decreased. Consequently, it is possible to achieve uniform distribution of the coolant, to effectively remove heat accumulating between the unit cells, and to greatly improve the performance and lifespan of the battery.

The invention claimed is:

1. A battery pack case in which a battery module having a plurality of stacked battery cells or unit modules ('unit cells') is mounted,
wherein the battery pack case is provided at an upper part and a lower part thereof with a coolant inlet port and a coolant outlet port, respectively, which are directed in opposite directions such that a coolant to cool the unit cells can flow from one side to the other side of the battery module in a direction perpendicular to a cell stacking direction, the battery pack case is further provided with a flow space ('coolant introduction part') extending from the coolant inlet port to the battery module and another flow space ('coolant discharge part') extending from the battery module to the coolant outlet port, and a flow channel width of the coolant introduction part and/or a flow channel width of the coolant discharge part is greater than that of each of the unit cells, thereby achieving uniform distribution of the coolant,
wherein a flow space ('battery module mounting part') extending from the coolant introduction part to the coolant discharge part has a flow channel width greater than that of each of the unit cells so as to cool electrode terminals of the unit cells, and
wherein the coolant discharge part has a vertical sectional area equivalent to 100 to 300% of that of the coolant inlet port, and
wherein the flow channel width of the coolant introduction part and/or the flow channel width of the coolant discharge part is equivalent to 105 to 500% of that of each of the unit cells.

2. The battery pack case according to claim 1, wherein the flow channel width of the battery module mounting part is equivalent to 105 to 500% of that of each of the unit cells.

3. The battery pack case according to claim 1, wherein the vertical sectional area of the coolant discharge part is equivalent to 150 to 250% of that of the coolant inlet port.

4. The battery pack case according to claim 1, wherein an upper end inside of the coolant introduction part facing a top of the battery module is configured to have a structure in which an inclination degree of an incline plane starting from an end of the battery pack case opposite to the coolant inlet port increases toward the coolant inlet port from the top of the battery module.

5. The battery pack case according to claim 4, wherein the upper end inside of the coolant introduction part comprises two or more continuous incline planes having different inclination degrees from one another.

6. The battery pack case according to claim 5, wherein the incline planes of the upper end inside comprise a first incline plane starting from the end of the battery pack case opposite to the coolant inlet port and a second incline plane provided between the first incline plane and the coolant inlet port so that the second incline plane has an inclination degree greater than that of the first incline plane.

7. The battery pack case according to claim 6, wherein the second incline plane has an inclination degree 20 to 500% greater than that of the first incline plane within a range in which the inclination degree of the second incline plane does not exceed 45 degrees with respect to the top of the battery module.

8. The battery pack case according to claim 6, wherein the first incline plane has an inclination of 15 degrees or less with respect to the top of the battery module.

9. The battery pack case according to claim 6, wherein the second incline plane has an inclination of 10 to 30 degrees with respect to the top of the battery module within a range in which the inclination degree of the second incline plane exceeds that of the first incline plane.

10. The battery pack case according to claim 6, wherein the coolant inlet port has an inclination degree equal to or less than that of the second incline plane.

11. The battery pack case according to claim 6, wherein the coolant inlet port has an inclination degree equal to or greater than that of the second incline plane.

12. The battery pack case according to claim 11, wherein the coolant inlet port has an inclination of 30 to 60 degrees with respect to the top of the battery module within a range in which the inclination degree of the coolant inlet port exceeds that of the second incline plane.

13. The battery pack case according to claim 1, wherein the end of the battery pack case opposite to the coolant inlet port is spaced apart from the top of the battery module by a height equivalent to 10% or less of that of the battery module.

14. The battery pack case according to claim 13, wherein the end of the battery pack case opposite to the coolant inlet port is spaced apart from the top of the battery module by a height of 1 to 10 mm.

15. The battery pack case according to claim 1, wherein each of the battery cells is a lithium secondary battery or a fuel cell.

16. The battery pack case according to claim 15, wherein the lithium secondary battery is a pouch-shaped battery or a prismatic battery.

17. The battery pack case according to claim 1, wherein the coolant outlet port has a uniform height with respect to a bottom of the battery module.

18. The battery pack case according to claim 1, wherein the battery pack case is configured so that a blowing fan is further mounted in the coolant inlet port or the coolant outlet port to move the coolant, introduced through the coolant inlet port, to the coolant outlet port, after the coolant passes through the battery module.

19. The battery pack case according to claim 1, wherein the battery pack case comprises an upper case mounted at a top of the battery module to define the coolant introduction part and a lower case mounted at a bottom of the battery module to define the coolant discharge part, the upper case and the lower case being coupled to each other by fastening members.

20. The battery pack case according to claim 19, wherein supporting bars to define the flow channel of the coolant introduction part and packing members to prevent leakage of the coolant are mounted at upper ends of opposite sides of the coolant introduction part.

21. The battery pack case according to claim 20, wherein the packing members are mounted to a top and bottom of each of the supporting bars.

22. The battery pack case according to claim 19, wherein a pair of supporting bars to define the flow channel of the coolant introduction part is mounted in spaces defined between the upper case and sides of the battery module.

23. The battery pack case according to claim 19, wherein a pair of supporting bars to define the flow channel of the coolant introduction part is formed in the shape of '¬' in vertical section and is mounted in spaces defined between the upper case and sides of the battery module and at portions of opposite sides of the upper end of the battery module.

24. The battery pack case according to claim 19, wherein supporting bars to define the flow channel of the coolant introduction part are mounted at opposite sides of the coolant introduction part, and packing members to prevent leakage of the coolant are mounted in spaces defined between the upper case and sides of the battery module.

25. The battery pack case according to claim 19, wherein the lower case is configured to have a bracket structure in which opposite ends of the lower case protrude upward.

26. A battery pack configured to have a structure in which a battery module is mounted in a battery pack case according to claim 1.

27. The battery pack according to claim 26, wherein the battery pack is used as a power source for electric vehicles, hybrid electric vehicles or plug-in hybrid electric vehicles.

28. The battery pack according to claim 1, wherein a width of the upper part of the battery pack case measured in a direction perpendicular to the coolant flow is less than a width of the lower part of the battery pack case measured in the direction perpendicular to the coolant flow.

\* \* \* \* \*